United States Patent
Jellen

(10) Patent No.: US 12,430,326 B2
(45) Date of Patent: Sep. 30, 2025

(54) GRAPH EMBEDDING FOR SERVICE HEALTH INCIDENT INSIGHTS

(71) Applicant: Microsoft Technology Licensing, LLC, Redmond, WA (US)

(72) Inventor: Christopher David Jellen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 18/394,145

(22) Filed: Dec. 22, 2023

(65) Prior Publication Data

US 2025/0209063 A1  Jun. 26, 2025

(51) Int. Cl.
| | |
|---|---|
| G06F 16/242 | (2019.01) |
| G06F 16/23 | (2019.01) |
| G06F 16/2457 | (2019.01) |
| G06F 16/28 | (2019.01) |
| G06F 16/332 | (2025.01) |
| G06F 16/34 | (2025.01) |

(52) U.S. Cl.
CPC ...... *G06F 16/2428* (2019.01); *G06F 16/2322* (2019.01); *G06F 16/24573* (2019.01); *G06F 16/285* (2019.01); *G06F 16/3328* (2019.01); *G06F 16/345* (2019.01)

(58) Field of Classification Search
CPC ............ G06F 16/2322; G06F 16/2428; G06F 16/24573; G06F 16/285; G06F 16/3328; G06F 16/345; H04L 41/0631; H04L 41/064; H04L 41/065
See application file for complete search history.

(56) References Cited

U.S. PATENT DOCUMENTS

| | | | |
|---|---|---|---|
| 11,372,940 B2* | 6/2022 | Ramanath | G06Q 10/063112 |
| 11,704,219 B1* | 7/2023 | Lerner | G06F 11/327 |
| | | | 714/57 |
| 2018/0349501 A1* | 12/2018 | Ramanath | G06F 16/285 |
| 2020/0287923 A1* | 9/2020 | Raghavendra | G06N 5/022 |
| 2021/0303638 A1* | 9/2021 | Zhong | G06F 40/169 |
| 2022/0019742 A1* | 1/2022 | Bhamidipaty | G06N 5/022 |
| 2022/0358005 A1* | 11/2022 | Saha | G06F 40/216 |
| 2023/0267033 A1* | 8/2023 | Mandal | G06N 5/022 |
| 2024/0193400 A1* | 6/2024 | Varghese | G06F 40/20 |
| 2025/0039037 A1* | 1/2025 | Memon | H04L 41/0631 |
| 2025/0165717 A1* | 5/2025 | Burton | G06F 40/30 |

* cited by examiner

*Primary Examiner* — James E Richardson
(74) *Attorney, Agent, or Firm* — Schwegman Lundberg & Woessner, P.A.

(57) ABSTRACT

A system and method for vector embedding of service incident data is described. In one aspect, a computer-implemented method comprising receiving service incident data includes free-form text data, structured metadata, and human-generated comments, constructing a graph representation of a service incident, the graph includes nodes representing the free-form text data, structured metadata, and human-generated comments of the service incident, and edges connecting related nodes, generating vector embeddings for the nodes and edges of the graph representation, applying dimensionality reduction to the vector embeddings to generate reduced embeddings, and storing the reduced embeddings and the vector embeddings in a database.

20 Claims, 12 Drawing Sheets

| 402 | FEATURE | TEXT | VECTOR |
|---|---|---|---|
| | TITLE | "LACE DEFECT" | [0.1, 0.3, 0.8] |
| | TIME | 1/1/2023 | [1.67E9] |
| | TEAM | "SHOES" | [1,0,0] |

FIG. 4

502 — HIGH DIMENSIONAL SPACE (100 DIMENSIONS)

| INCIDENT 1 | [X1,X2,X3...] |
|---|---|
| INCIDENT 2 | [Y1,Y2,Y3...] |
| INCIDENT 3 | [Z1,Z2,Z3...] |

504 — REDUCED SPACE (2 DIMENSIONS)

| INCIDENT 1 | [X1, X2] |
|---|---|
| INCIDENT 2 | [Y1, Y2] |
| INCIDENT 3 | [Z1, Z2] |

FIG. 5

GRAPH EMBEDDING FOR SERVICE HEALTH INCIDENT INSIGHTS

TECHNICAL FIELD

The subject matter disclosed herein generally relates to a system for reducing the dimensionality of embedded service incident data and processing service incident queries. Specifically, the present disclosure addresses systems and methods for dimensional reduction of vector embedding and processing service incident queries.

BACKGROUND

Service incidents in complex computing environments can significantly impact customer experience and business operations. However, effectively detecting, diagnosing, and resolving incidents remains challenging despite advances in monitoring tools and analytics. Incident management often relies on manual investigation and information retrieval across disconnected systems. This frequently leads to slow resolution and a lack of institutional learning.

Prior art attempts to address these inefficiencies through natural language processing of incident records or rules-based correlation of incidents. However, such approaches prove brittle and limited in systematically identifying complex relationships within large volumes of unstructured incident data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a table illustrating an example of vector embedding in accordance with one example embodiment.

FIG. 5 illustrates an example of dimensionality reduction in accordance with one example embodiment.

DETAILED DESCRIPTION

Figure 1:
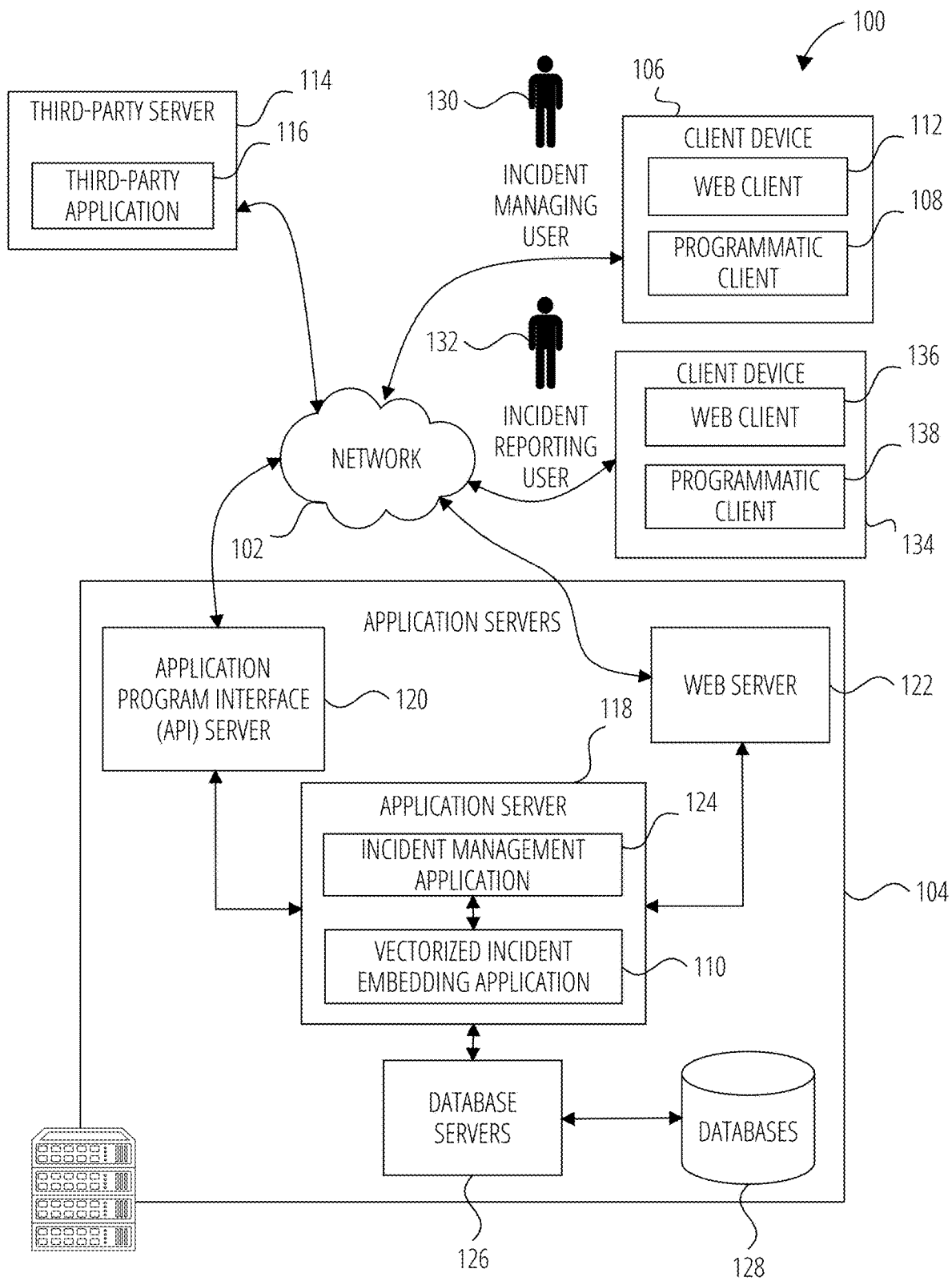
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Graph-based representations of service relationships and workflows have grown commonplace. However, their application in incident management remains largely unexplored despite the potential benefits. One major challenge lies in enabling high-level insights from an entire knowledge graph as well as performing query capabilities around specific entities and subgraphs. Furthermore, existing tools lack interfaces allowing non-technical users to intuitively interact with and gain insights from graph-structured data.

The present application describes improved techniques to systematically model service incidents as contextual graphs using reduced vector embeddings. Such techniques provide for rapid information retrieval, uncover hidden systemic issues fueling recurring incidents, and enhance institutional learning of related incidents. The present application provides a technical solution through a novel application of graph embeddings and dimensionality reduction to incident management workflows. Meaningful graph-based incident representations coupled with accessible interactive interfaces facilitate efficient search, automated cluster analysis, and targeted process improvements.

The term "dimensional reduction" used herein, refers to the process of transforming data from a high-dimensional space into a lower-dimensional space so that the reduced representation retains meaningful properties of the original data. This technique is particularly useful in the context of incident management, where incidents are represented as complex, multi-dimensional graphs that include various features such as textual descriptions, timestamps, and categorical data.

The purpose of dimensional reduction in this context is to simplify the data for visualization and analysis while preserving the structure and relationships inherent in the original high-dimensional dataset. By reducing the number of dimensions, the data becomes more manageable and can be visualized in a 2D or 3D space, which is more accessible for human interpretation and can reveal patterns or clusters that may not be apparent in higher dimensions.

Dimensional reduction is achieved through algorithms such as Uniform Manifold Approximation and Projection (UMAP) or Principal Components Analysis (PCA), which are designed to maintain the 'distance' or similarity between data points, thereby preserving the semantic meaning of the data as much as possible during the reduction process. This allows for the identification of similar incidents, clustering of incidents, and more efficient retrieval of relevant past incidents to aid in the resolution of new incidents.

In one example, the present application describes a system that represents service health incidents as node graphs, including evolving features like summaries and comments. It develops vectorized embeddings of these graphs to enable semantic similarity search and clustering projections for intuitive triage assistance. One feature of the system is posing incidents as graphs prior to embedding, allowing higher fidelity incident understanding. This facilitates improved information retrieval and visual cluster identification over regular expression/text searches or structured queries. The 2D visualization and underlying high-dimensional embeddings unlock faster mitigation and better resourcing insights.

In one example embodiment, a system and method for vector embedding of service incident data is described. In one aspect, a computer-implemented method comprising receiving service incident data includes free-form text data, structured metadata, and human-generated comments, constructing a graph representation of a service incident, the graph includes nodes representing the free-form text data, structured metadata, and human-generated comments of the service incident, and edges connecting related nodes, generating vector embeddings for the nodes and edges of the graph representation, applying dimensionality reduction to the vector embeddings to generate reduced embeddings, and storing the reduced embeddings and the vector embeddings in a database. An example of edges connecting related nodes includes an incident (node) that might have a comment (typed edge) with a timestamp (edge feature) to the free-form text node with features such as content, user, and the user's role within an organization.

As a result, one or more of the methodologies described herein facilitate solving the technical problem of tuning the processing of incident queries and identifying similar incidents. The presently described system leverages dimensionality reduction of the graph embeddings to enable intuitive visualization of incidents in a 2D or 3D space. By projecting the high-dimensional embeddings down to a few dimensions, inherent clusters and neighborhoods of related incidents can be identified through existing metrics or simple proximity.

This dimensional transformation enables users to visually tune and adjust similarity thresholds in the embedded space. For example, an engineer could use the visual interface to expand a selection circle around a problematic incident to identify other nearby neighbors. By interactively modifying the similarity search radius, they are essentially adjusting the threshold that determines whether other incidents are considered part of an actionable cluster.

The ability to refine this threshold through visual tools provides a technical improvement over manual trial-and-error approaches to similarity analysis. The visual interface transforms an intractable high-dimensional tuning challenge into simple drag-and-drop interactions. Further, once useful thresholds are found, they can be persisted to automatically surface similar incident clusters for downstream triage.

In this way, the dimensional reduction transforms high-fidelity embeddings into an interactive space that drives technical improvements in how computers analyze relationships between service incidents. The refined similarity thresholds also lead to better-automated clustering and alerting capabilities. As such, one or more of the methodologies described herein obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106 and client device 134. An incident managing user 130 operates the client device 106. The client device 106 includes a web client 112 (e.g., a browser) and a programmatic client 108 (e.g., an incident management application) that is hosted and executed on the client device 106. An incident reporting user 132 operates the client device 134. The client device 134 includes a web client 136 and a client device 134.

The incident reporting user 132 refers to any individual who manually creates and submits a new service incident into the incident management system (e.g., incident management application 124). Incident reporters typically include customers, frontline engineers, or technical support staff. When submitting a new incident, reporters will provide structured information like affected services, perceived severity, and monitoring details. They also include free-form textual descriptions summarizing the observed issue and relevant impact.

The incident managing user 130 refers to any back-end engineer or technical analyst who interacts with the graph-based incident management system to search historical incidents. Investigators access the interactive visualization interface allowing incident exploration based on embedding similarity or structured filters. When querying the graph embeddings, the incident managing user 130 selects, via the web client 112 or programmatic client 108, an incident of interest and applies filters for metadata like affected services, duration, customer impact, etc., as needed. The incident managing user 130 can configure relative filter weights to fine-tune searches. As output, the most relevant historical incidents are displayed (in a 2D/3D graph) based on query parameters. This enables accelerated diagnosis by identifying prior resolution paths for similar incidents.

An Application Program Interface (API) server 120 and a web server 122 provide respective programmatic and web interfaces to application servers 104. A specific application server 118 hosts an incident management application 124 and a vectorized incident embedding application 110. Both incident management application 124 and vectorized incident embedding application 110 include components, modules, and/or applications.

The incident management application 124 includes a server-side application. In one example, the incident management application 124 includes a platform that facilitates detection, reporting, tracking, diagnosis, and eventual resolution of issues disrupting the delivery of technology services and products. The incident management application 124 serves as a repository orchestrator that ingests various data pertaining to service outages, performance degradations, vulnerabilities, bugs, and customer-impacting events. Sources of incoming data range from automated alerts triggered by health monitors to manual incident creation by technical support teams to customer complaints on product forums.

The incident management application 124 aggregates and processes this heterogeneous data through specialized workflows tailored to each incident type. All incidents are assigned standard attributes like title, description, affected service, and component during intake. Automated parsing also extracts relevant metadata like dates, entities, sentiment, syslogs, or stack traces associated with the issue description. The parsed content gets stored in SQL databases or NoSQL data lakes along with unstructured descriptions and communications. As work progresses on an incident, additional context is inserted in the form of comments, status changes, and identified solutions. An example embodiment of the incident management application 124 is described further below with respect to FIG. 2.

The vectorized incident embedding application 110 communicates with the incident management application 124. In one example, the vectorized incident embedding application 110 enables the discovery of patterns and insights across incidents captured with the incident management application 124. The vectorized incident embedding application 110 transforms the diverse set of incident data into unified mathematical representations called embeddings that encode semantic meaning. The vectorized incident embedding application 110 first constructs a knowledge graph with incidents represented as nodes and their contextual relationships with other entities like comments, users, or event logs represented as nodes and edges. Graph embedding techniques are then applied to translate graph elements into dense vectors in a high-dimensional space.

Specifically, textual features from incident descriptions and comments are embedded as vectors of real numbers via pre-trained natural language models. Categorical entities like services, components, or statuses are encoded through numeric representations or learned embeddings. Temporal attributes such as occurrence time and duration are vectorized through simple ordinal mappings. By composing all these atomic vector representations, the algorithm derives a singular vector encapsulating the entire context for every incident node and its connections.

The generated high-dimensional embeddings allow performing similarity calculations using geometric distances or other metrics. However, additional processing proves necessary for human comprehension. Dimensionality reduction through methods like UMAP surfaces visual clusters of related incidents. It also enables querying incidents based on filtered features more intuitively. The incident managing user 130 can visually explore neighborhoods of incidents sharing common vectors to uncover new patterns. The reduced vectors further power interactive graphical interfaces that can visually filter incidents based on categories, timelines, or custom similarity measures.

By converting complex incident semantics into accessible vector representations and visuals, the vectorized incident embedding application 110 enables incident investigation and streamlined resolution. The vectorized incident embeddings thus augment the detection, diagnosis, and handling of issues hindering service delivery.

The application server 118 is shown to be communicatively coupled to database servers 126 that facilitates access to an information storage repository or databases 128. In an example embodiment, the databases 128 include storage devices that store information to be processed by the incident management application 124 and the vectorized incident embedding application 110.

Additionally, a third-party application 116 may, for example, store another part of the incident management application 124, or include a cloud storage system. For example, the third-party application 116 stores other resource utilization data related to the application servers 104. In another example, the third-party server 114 is associated with another server farm different from the server farm of the application servers 104. The third-party application 116 executing on a third-party server 114, is shown as having programmatic access to the application server 118 via the programmatic interface provided by the Application Program Interface (API) server 120. For example, the third-party application 116, using information retrieved from the application server 118, may support one or more features or functions on a website hosted by the third party.

Figure 2:
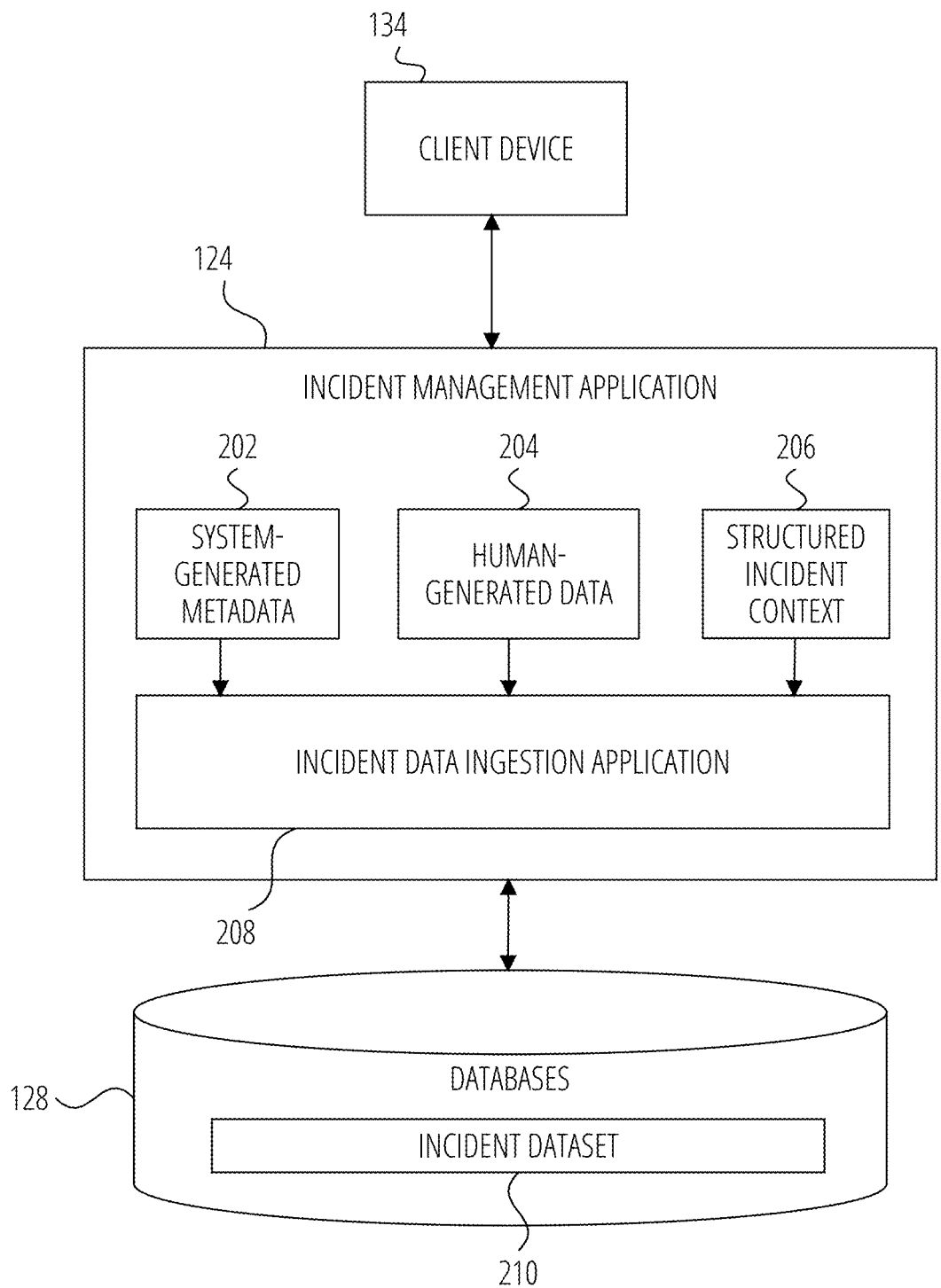
FIG. 2 is a block diagram illustrating an incident management application in accordance with one example embodiment.

FIG. 2 is a block diagram illustrating the incident management application 124 in accordance with one example embodiment. The incident management application 124 includes system-generated metadata 202, human-generated data 204, structured incident context 206, and incident data ingestion application 208.

The system-generated metadata 202 refers to structured attributes automatically captured by the incident management application 124 during incident creation and subsequent updates without requiring explicit user input. Examples include:
Timestamps such as time detected, last updated, etc.
Incident identifier numbers and codes
Values for categorical fields like status, priority levels, etc.
Detecting tool, service, and team names
Associations with other database entities The human-generated data 204 includes free-form textual content entered directly by users such as customers, engineers, support staff, etc., involved during the incident lifecycle. Examples include:
Problem descriptions and impact notes
Troubleshooting updates
Resolution summaries
Back-and-forth question-answer threads The structured incident context 206 covers structured context attributes associated with incidents requiring explicit user validation or updates. Typical examples include:
Affected services and component names
Severity and SLA violation flags
Customer impact assessments
Categorization of issues into broader classes The incident data ingestion application 208 receives service incident data (e.g., system-generated metadata 202, human-generated data 204, structured incident context 206) and handles the ingestion of structured, unstructured, and textual data modalities into standardized schemas. In some examples, the incident data ingestion application 208 includes advanced data ingestion pipelines to intake varied information from diverse sources to create a consolidated record of service issues and outages. When predefined warning thresholds are exceeded, automated connectors stream near real-time metrics/alerts and syslogs from health monitoring tools. Scripted jobs further pull historical event data from logs and transaction archives to detect anomalies. Webhooks also capture notifications/telemetry from external systems. These systematic inflows are supplemented by manual submissions from customers and technical users through online forms, email, chatbots, and contact centers.

The incident data ingestion application 208 collates and processes these raw signals through an automated classification stage. Heuristics derived from statistical machine learning models categorize incoming issues by type, severity, and context based on signature patterns. For example, stack traces pointing to a specific server error get tagged as application faults, while streams of HTTP Error 404 messages could indicate a network misconfiguration. Complex NLP extracts entities, relationships, and escalation cues from unstructured descriptive text. All metadata is indexed while parsed content gets persisted in backend data stores.

As work progresses on an incident, the incident data ingestion application 208 enables incident managing user 130/incident reporting user 132 to append additional evidence, analyses, and remediation details through file uploads, comments, and API updates. Version histories maintain chronological data provenance. The cumulative curated information forms the systemic record powering downstream incident resolution workflows.

Unified retention policies determine archival cycles for historical incidents. However, aggregated data flows into ML training loops for continuous model improvements. Clustering algorithms further help surface insights from past datasets. The incident data ingestion application 208 empowers optimal incident handling by supporting flexible and intelligent information capture.

The incident data ingestion application 208 maintains incident dataset 210, stored in databases 128. In one example, the incident dataset 210 includes:

Structured Metadata Attributes (from system-generated metadata 202): this includes all system-captured information about incidents like unique IDs, timestamps, detecting tools, status values, severity designations, and other categorical enums that are automatically recorded.

Human-Generated Textual Content (from human-generated data 204): all free-form text inputs by end-users and technical teams are stored, including initial problem descriptions, ongoing mitigation notes, resolution summaries, and conversational threads for context.

Structured Incident Context (from structured incident context 206): additional user-validated attributes that classify and enrich incident records are stored, such as affected services, customer impact flags, SLA breach markers, and standardized categorization labels.

Derived Insights: further enrichments generated by the underlying statistical and ML models are persisted, such as predicted issue categories, identified escalation signals, extracted ontology concepts, and named entities.

Incident Associations: formal relationships are stored, linking related cross-functional entities, infrastructure components, cloned alerts, and duplicated incidents to enable upstream root cause analysis.

Temporal Version Histories: timestamped audit changes for incident records are versioned to preserve data provenance across the lifecycle, enabling historical reviews.

Figure 3:
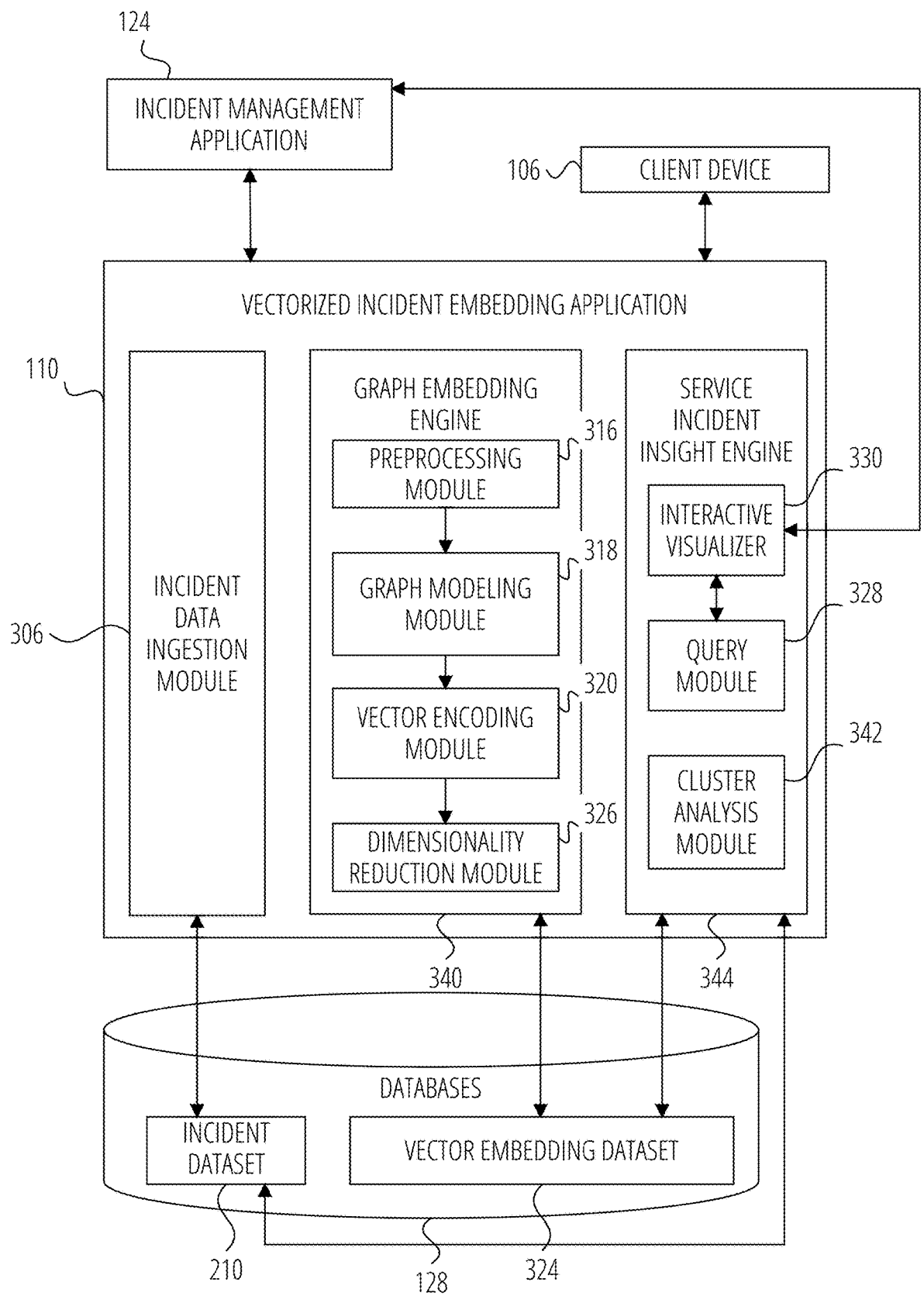
FIG. 3 is a block diagram illustrating a vectorized incident embedding application in accordance with one example embodiment.

FIG. 3 is a block diagram illustrating the vectorized incident embedding application 110 in accordance with one example embodiment. The vectorized incident embedding application 110 includes an incident data ingestion module 306, a graph embedding engine 340, and a service incident insight engine 344. The vectorized incident embedding application 110 communicates with incident management application 124 via the incident data ingestion module 306 to access incident dataset 210.

The incident data ingestion module 306 accesses service incident data (e.g., incident dataset 210) from incident management application 124 (which receives incident data from various sources like monitoring tools, customer tickets, manually logged incidents, etc.). The incident data ingestion module 306 then ingests structured, unstructured, and textual data modalities into standardized schemas.

As described in FIG. 2, the incident management application 124 leverages high-volume connectors to stream monitoring alerts, event logs, and notifications from external tools. Scripted jobs also pull historical signals from archived transaction dumps and syslog repositories to identify past anomalies. User-submitted reports supplement these systematic inflows via web forms, email, chatbots, call center tickets, and other API calls. Standardized parsers process the incoming data, extracting key metadata like timestamps, tool names, affected services, etc. Natural language models analyze free-form textual descriptions to identify concepts, relationships, and escalation cues. The aggregated content is classified into incidents, assigned default severity scores, and routed to appropriate teams. All information gets indexed and stored in distributed data lakes optimized for resilience and query performance. Tracking IDs stitch-related events through common incident associations.

In one example, the incident management application 124/incident data ingestion module 306 orchestrates the collection, validation, processing, storage, and routing of such follow-on content. All incident data in the incident dataset 210 is versioned for audit. Archival policies determine retention cycles while anonymized datasets are continually extracted to train ML models.

The graph embedding engine 340 generates high-dimensional vector embeddings for full graph representations, achieves fidelity for all data modalities tied to an incident, and projects high-dimensional embeddings to 2D/3D. In one example, the graph embedding engine is designed to ingest incident dataset 210 and generate vector representations for each incident. Graphs are flexible data structures that can encode entities, relationships, and attributes. Each incident comprises a central node with associated features like title, severity, timestamps, etc. Contextual comments get connected as child nodes. Undirected edges connect this hierarchical structure.

By processing the incident graph database, the graph embedding engine 340 learns to map incidents into a high-dimensional hyperspace such that proximity indicates similarity. Related incidents cluster together based on shared traits. A neural training phase tunes embedding vectors to minimize the distance between adjacent nodes. Multiple loss functions fine-tune model topology and weights for optimal mappings.

In one example, the graph embedding engine 340 offers inputs to configure embedding spaces for different teams, time ranges, or services. Once trained, the graph embeddings can index new incidents as they stream in-providing applications with an efficient semantic index for information retrieval. The graph embedding engine 340 stores the vector embedding dataset 324 in databases 128. The vector embedding dataset 324 enables previously impossible similarity queries across both structured and unstructured data.

The graph embedding engine 340 supports dimensionality reduction methods like UMAP to visualize incident clusters, allowing engineers to explore inter-relationships easily. By projecting embeddings from high-dimensional to 2D space, users can visually hunt for dense outlier groups that point to recurring issues or opportunities. The graph embeddings enhance how teams can search, analyze, and interpret complex incident management data.

In one example embodiment, the graph embedding engine 340 includes a preprocessing module 316, graph modeling module 318, vector encoding module 320, and dimensionality reduction module 326. The preprocessing module 316 accesses raw incident data (e.g., incident dataset 210) ingested from incident management application 124, event streams, and user reports come in heterogeneous formats and fidelity. The preprocessing module 316 integrates this variety into a common schema while retaining all information.

Structured fields like timestamps and statuses get aligned and validated. Unstructured text, including summaries and conversational logs, is passed through NLP pipelines to extract embedded signals. Additional enrichment comes via joining external contexts from knowledge bases. The refined dataset feeds the next phase.

In one example embodiment, the graph modeling module 318 constructs an incident graph representation, transforming the heterogeneous data modalities into a unified structure. For example, the graph modeling module 318 initializes a central parent node for each incident, capturing its metadata, descriptions, etc., as node features. The graph modeling module 318 adds child nodes for each temporal comment/update to capture operational context. The graph modeling module 318 connects parents and children using unlabeled, undirected edges (or typed or directed edges) to model progression and outputs the complete graph encoding topical, textual, structural, and temporal elements.

In another example embodiment, the graph modeling module 318 transforms the preprocessed incident records from preprocessing module 316 into node-edge graphs with configurable topology. The modular architecture allows composing graphs tuned for different subsystems. A common template models the incident payload as the primary node with attributes like title, severity, and service. Supplementary child nodes capture other entities like user comments. Undirected edges link this hierarchical structure. Features attached to nodes and edges encode signals like text embeddings, temporal weights, and categorical traits. The tunable graph template unifies all incident data.

In one example embodiment, the vector encoding module 320 embeds constructed incident graphs into vector representations in high-dimensional embedding space. The vector encoding module 320 employs distinct encoders for free-form text, discrete entities, and temporal attributes. For example, textual content is embedded using sentence transformers, categorical variables are encoded as unique indices, and timestamps are converted to scalar values. The vector encoding module 320 learns unified vector representation for every node by integrating specialized encoders, capturing all data facets. The vector encoding module 320 outputs vector database stores embedding catalog, enabling downstream analytic tasks.

In another example embodiment, the vector encoding module 320 includes a custom deep neural network architecture based on graph convolutional networks and attention mechanisms that process the graphs in batches. Through automated hyperparameter search and gradient-based training, the model learns to encode nodes, edges, and topological patterns into optimized vector embeddings that map related incidents closer in space. The high-dimensional sparse vector output preserves the semantic relationships and similarities from the graph domain. The indexed embeddings serve as versatile mathematical representations of all incident knowledge. The vector embedding dataset 324 is stored in databases 128.

In one example embodiment, the dimensionality reduction module 326 lowers dimensions of learned vector embeddings using algorithms like UMAP, to create reduced representations. The reduced vectors accurately preserve similarities between incidents from high-dimensional space and allow projecting vectors to 2D/3D for human visualization and exploration. The dimensionality reduction module 326 also preprocesses for interactive rendering and discovery of macro incident clusters.

In another example embodiment, the dimensionality reduction module 326 projects higher dimensional encoded vectors from vector encoding module 320 into lower-dimensional vectors. While vector encodings support analytical use cases like similarity search and clustering natively, visual applications require projecting incidents into 2D/3D space while preserving structure. Techniques like UMAP learn a projection matrix that lowers dimensions for visualization such that proximity relations match the high-dimensional case. This allows intuitive human exploration to spot clusters, trends, and outliers through data discovery.

The service incident insight engine 344 includes a query module 328, a cluster analysis module 342, and an interactive visualizer 330.

In one example embodiment, the interactive visualizer 330 presents an analytic interface to intuitively explore incidents using reduced vectors by allowing visually investigating clusters of related incidents, enabling users to drill down to analyze specific clusters for chronic systemic deficiencies, permitting filtering, slicing and pivoting lens over dataset, and dynamically updating on user interactions to enable fluid exploratory analysis.

In another example embodiment, the interactive visualizer 330 provides a graphical user interface for engineers and managers to explore incident graph embeddings projected onto a 2D plane using dimensionality reduction algorithms. The scatter plots visualize each incident as a data point placed based on embedding proximity, enabling the discovery of clusters with common traits.

Interactive controls allow filtering incidents by attributes like time range, team, or status. Selecting specific incidents or clusters retrieves metadata like titles and aggregate statistics. The visualizer turns high-dimensional embeddings into an intuitive overview to spot trends and recurring issues and drill down to details.

The query module 328 includes a query interface that allows low-code or natural language search over the vector database to find related incidents. Engineers can retrieve historical tickets similar to new cases for context. Similarity is defined as nearness in the embedding space, ranked by distance functions. The versatile queries augment keyword search with semantic matching across structured and unstructured signals.

In one example embodiment, the cluster analysis module 342 identifies clusters of closely related incidents based on vector embeddings by applying density-peak detection or hierarchical algorithms to group incidents in embedding space. As such, the cluster analysis module 342 enables discovering groups sharing operational attributes, diagnostics, etc.

In another example embodiment, the cluster analysis module 342 enables automated clustering segmentation in the high-dimensional space groups together with incidents with shared vector traits indicative of common underlying issues. Cluster cardinality, density, and outlier metrics quantify groups. Tracking clusters over time can reveal growing problems. Root cause analysis can uncover signals distinguishing clustered subsets. The aggregated insights guide engineering prioritization by revealing systemic weaknesses.

The incident management application 124 relies on thresholds and alert rules to trigger incident tickets for events like error rate spiking. Configuring these rules requires balancing sensitivity-setting thresholds low risks excessive alerts while higher bars may miss real problems.

The service incident insight engine 344 helps calibrate threshold levels through data-driven feedback. For example, automated clustering may reveal a dense group of related incidents with titles like "High latency warning." For example, drilling down shows the common trait of crossing a 50 ms threshold. However, upon checking logs, the actual degradation seems minor. This finding suggests the current 50 ms latency threshold defines incidents too aggressively. The infrastructure reliably absorbs even 100 ms delays. So the threshold can be adjusted higher to suppress incident noise. Conversely, another sparse cluster with few but high-priority tickets around crash events hints that the error rate threshold should be lowered to capture problems early.

By quantifying clusters, the service incident insight engine 344 guides optimal threshold tuning. Lower priority groups indicate alerts firing too readily; hence, thresholds can be raised. Whereas sparse but severe clusters suggest thresholds should be lowered for early detection. This augments rule-based configuration (or engineer-defined configuration) with intelligence mined from historical system behavior.

In one example, the service incident insight engine 344 provides metrics to iteratively adjust alert rules so incident signals trigger at appropriate sensitivities-avoiding both false positives and false negatives. This maintains oversight quality while reducing monitoring costs. The data-guided feedback loop constitutes an advantage of the insight engine.

FIG. 4 is a table 402 illustrating an example of vector embedding in accordance with one example embodiment. The table 402 shows how different data modalities like text, timestamps, and categories can be encoded into vector representations to enable mathematical operations.

FIG. 5 shows a table 502 and a table 504. Both tables illustrate how dimensionality reduction algorithms project incidents from a high-dimensional embedding space to a 2D/3D space while preserving the relationships between incidents. This enables intuitive visualization.

Figure 6:
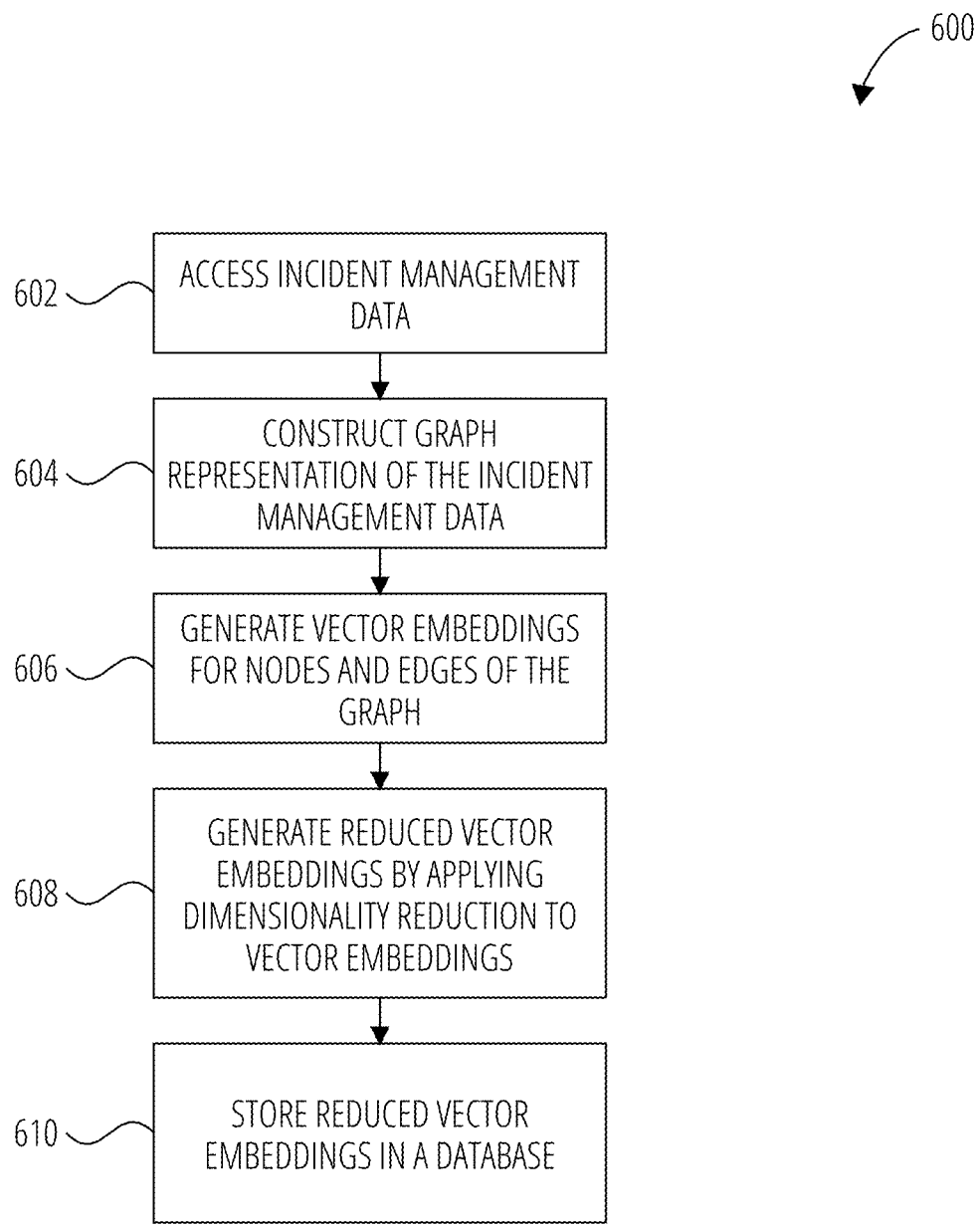
FIG. 6 is a flow diagram illustrating a method for generating reduced vector embeddings in accordance with one example embodiment.

FIG. 6 is a flow diagram illustrating a method for generating reduced vector embeddings in accordance with one example embodiment. Operations in the method 600 may be performed by the vectorized incident embedding application 110, using components (e.g., modules, engines) described above with respect to FIG. 3. Accordingly, the method 600 is described by way of example with reference to the vectorized incident embedding application 110. However, it shall be appreciated that at least some of the operations of the method 600 may be deployed on various other hardware configurations or be performed by similar components residing elsewhere. For example, some of the operations may be performed at the client device 106.

According to some examples, the method 600 includes accessing incident management data at block 602. In one example, the incident data ingestion module 306 accesses raw data (e.g., incident dataset 210) related to service incidents from monitoring systems, event streams, help desk tickets etc.

According to some examples, the method 600 includes constructing graph representation of the incident management data at block 604. In one example, the graph modeling module 318 converts the heterogeneous incident data (e.g., incident dataset 210) into a structured graph format with incidents as nodes, related entities as connected child nodes and semantic links as edges.

According to some examples, the method 600 includes generating vector embeddings for nodes and edges of the graph at block 606. In one example, the vector encoding module 320 runs graph embedding algorithms to encode nodes, edges, attributes, and topological structure into numeric vector representations that map related entities closer in vector space.

According to some examples, the method 600 includes generating reduced vector embeddings by applying dimensionality reduction to vector embeddings at block 608. In one example, the dimensionality reduction module 326 lowers the dimensionality of the node and edge vectors using techniques like UMAP to create reduced embeddings suited for human-scale visualization and exploration.

According to some examples, the method includes storing reduced vector embeddings in a database at block 610. In one example, the dimensionality reduction module 326 persists both the reduced 2D/3D vector embeddings and higher fidelity vector embeddings in a datastore (e.g., vector embedding dataset 324) to power downstream usage scenarios like search and analytics.

Figure 7:
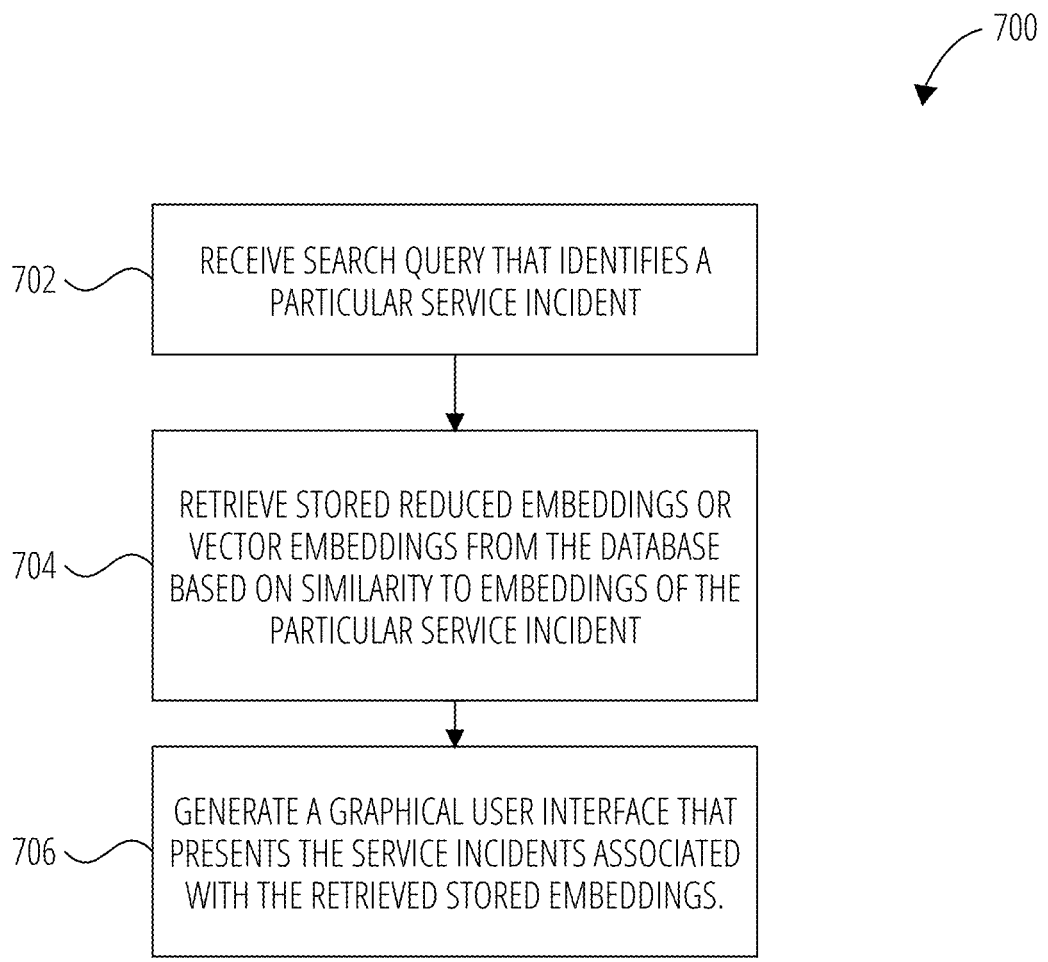
FIG. 7 is a flow diagram illustrating a method for generating a graphical user interface in accordance with one example embodiment.

FIG. 7 is a flow diagram illustrating a method 700 for generating a graphical user interface in accordance with one example embodiment. Operations in the method 700 may be performed by the vectorized incident embedding application 110, using components (e.g., modules, engines) described above with respect to FIG. 3. Accordingly, the method 700 is described by way of example with reference to the vectorized incident embedding application 110. However, it shall be appreciated that at least some of the operations of the method 700 may be deployed on various other hardware configurations or be performed by similar components residing elsewhere. For example, some of the operations may be performed at the client device 106.

According to some examples, the method 700 includes receiving search query that identifies a particular service incident at block 702. In one example embodiment, the query module 328 receives a search request from a user looking to find related historical incidents. The search criteria comprise details that identify the particular service incident they need insights into. This may include ticket ID, summary, error codes, tags, etc.

According to some examples, the method 700 includes retrieving stored reduced embeddings or vector embeddings from the database based on similarity to embeddings of the particular service incident at block 704. In one example, the cluster analysis module 342 uses the search query details to construct an embedding for the incident. The cluster analysis module 342 compares this against the database of stored vector representations for historical incidents using similarity functions. The 342 then identifies and retrieves the most similar vector embeddings, which represent previous incidents with common semantic signals.

According to some examples, the method 700 includes generating a graphical user interface that presents the service incidents associated with the retrieved stored embeddings at block 706. In one example, the interactive visualizer 330 renders the search results as an interactive list/graph of incident tickets ranked by vector similarity score. Each result excerpt includes key metadata like title, timestamp, and resolution details. The user can browse this list/graph to select results that share commonalities with their investigation context and derive insights from remedial actions taken in the past.

Figure 8:
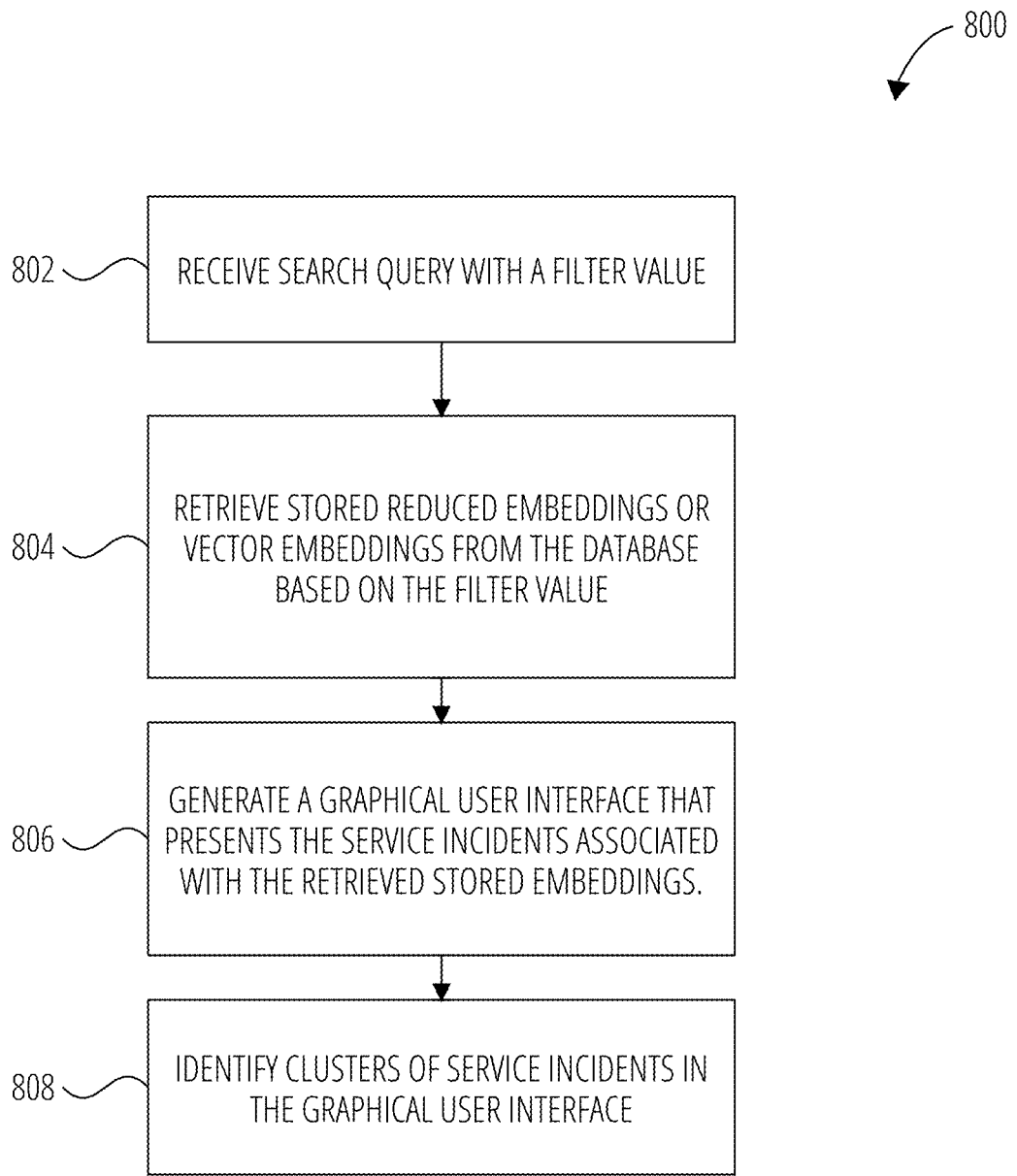
FIG. 8 is a flow diagram illustrating a method for identifying clusters of service incidents in accordance with one example embodiment.

FIG. 8 is a flow diagram illustrating a method for identifying clusters of service incidents in accordance with one example embodiment. Operations in the method 800 may be performed by the vectorized incident embedding application 110, using components (e.g., modules, engines) described above with respect to FIG. 3. Accordingly, the method 800 is described by way of example with reference to the vectorized incident embedding application 110. However, it shall be appreciated that at least some of the operations of the method 800 may be deployed on various other hardware configurations or be performed by similar components residing elsewhere. For example, some of the operations may be performed at the client device 106.

According to some examples, the method 800 includes receiving search query with a filter value at block 802. In one example, the query module 328 receives a search request from the user consisting of filter criteria like severity level, error types, timestamp range, etc. This allows for narrowing down the investigation scope.

According to some examples, the method 800 includes retrieving stored reduced embeddings or vector embeddings from the database based on the filter value at block 804. In one example, the query module 328 uses the supplied filters to query the database and retrieve a subset of incident embeddings matching the criteria.

According to some examples, the method 800 includes generating a graphical user interface that presents the service incidents associated with the retrieved stored embeddings at block 806. In one example, the interactive visualizer 330 renders the filtered incidents with their 2D/3D reduced embeddings on an interactive scatter plot. Related incidents are clustered together.

According to some examples, the method 800 includes identifying clusters of service incidents in the graphical user interface at block 808. In one example, the cluster analysis module 342 applies density-based clustering algorithms to identify and highlight clusters of closely related incidents on the embedding plot.

Figure 9:
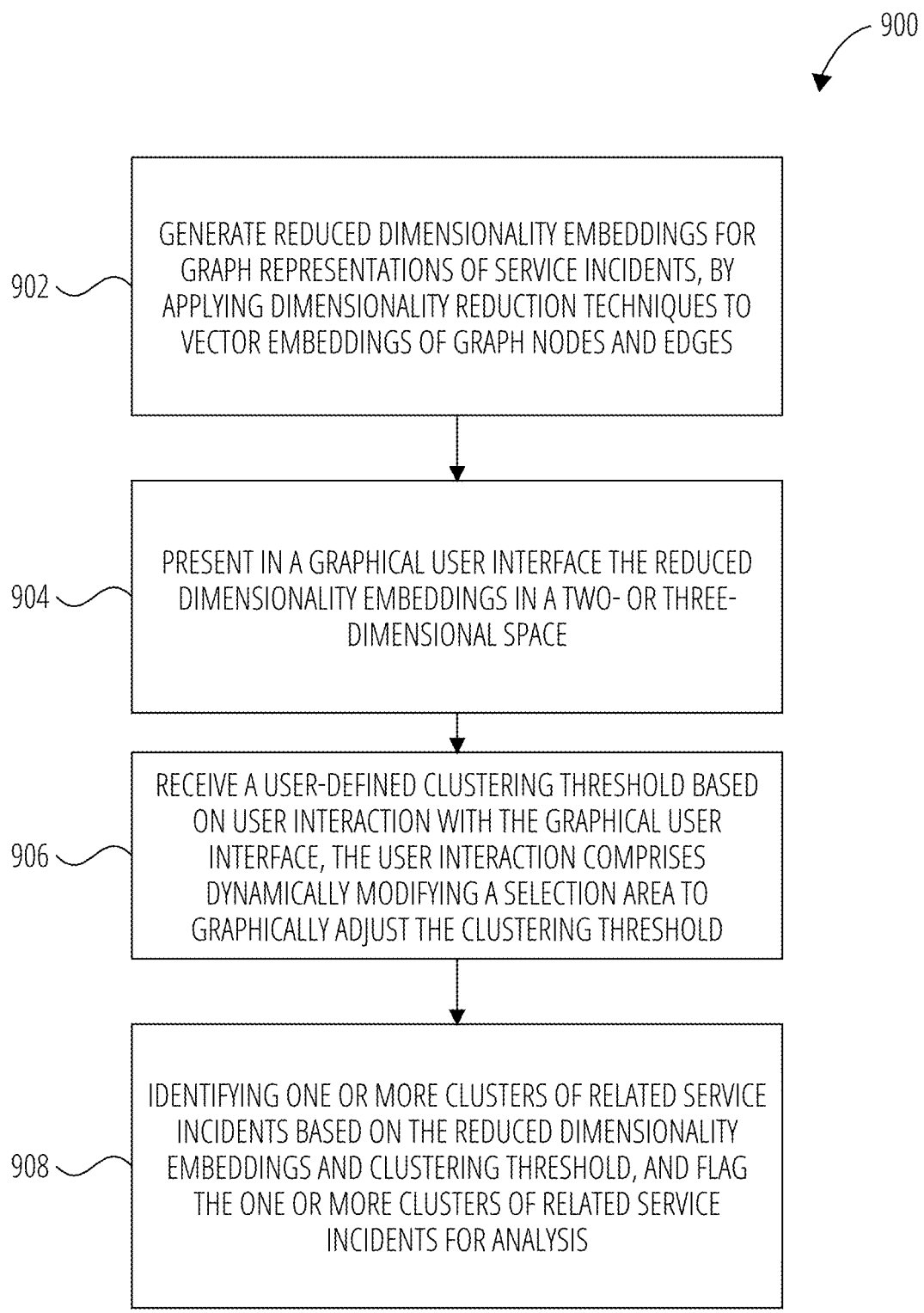
FIG. 9 is a flow diagram illustrating a method for identifying clusters of related service incidents in accordance with one example embodiment.

FIG. 9 is a flow diagram illustrating a method for identifying clusters of related service incidents in accordance with one example embodiment. Operations in the method 900 may be performed by the vectorized incident embedding application 110, using components (e.g., modules, engines) described above with respect to FIG. 3. Accordingly, the method 900 is described by way of example with reference to the vectorized incident embedding application 110. However, it shall be appreciated that at least some of the operations of the method 900 may be deployed on various other hardware configurations or be performed by similar components residing elsewhere. For example, some of the operations may be performed at the client device 106.

According to some examples, the method 900 includes generating reduced dimensionality embeddings for graph representations of service incidents, by applying dimensionality reduction techniques to vector embeddings of graph nodes and edges at block 902. In one example, the dimensionality reduction module 326 applies dimensionality reduction algorithms like UMAP to create 2D/3D reduced embeddings that map related incidents closer together.

According to some examples, the method 900 includes presenting in a graphical user interface the reduced dimensionality embeddings in a two- or three-dimensional space at block 904. In one example, the interactive visualizer 330 visually renders the reduced incident embeddings on an interactive scatter plot. Related incidents appear closer.

According to some examples, the method 900 includes receiving a user-defined clustering threshold based on user interaction with the graphical user interface, the user interaction comprises dynamically modifying a selection area to graphically adjust the clustering threshold at block 906. In one example, the interactive visualizer 330 allows the user to fluidly adjust the density threshold that determines clustering, just by dragging an on-screen slider. This gives flexible interactive control over the cluster granularity.

According to some examples, method 900 includes identifying one or more clusters of related service incidents based on the reduced dimensionality embeddings and clustering threshold and flagging one or more clusters of related service incidents for analysis at block 908. In one example, cluster analysis module 342 runs density-based clustering using the user-set threshold to highlight related incident groups and flag them for further analysis.

Figure 10:
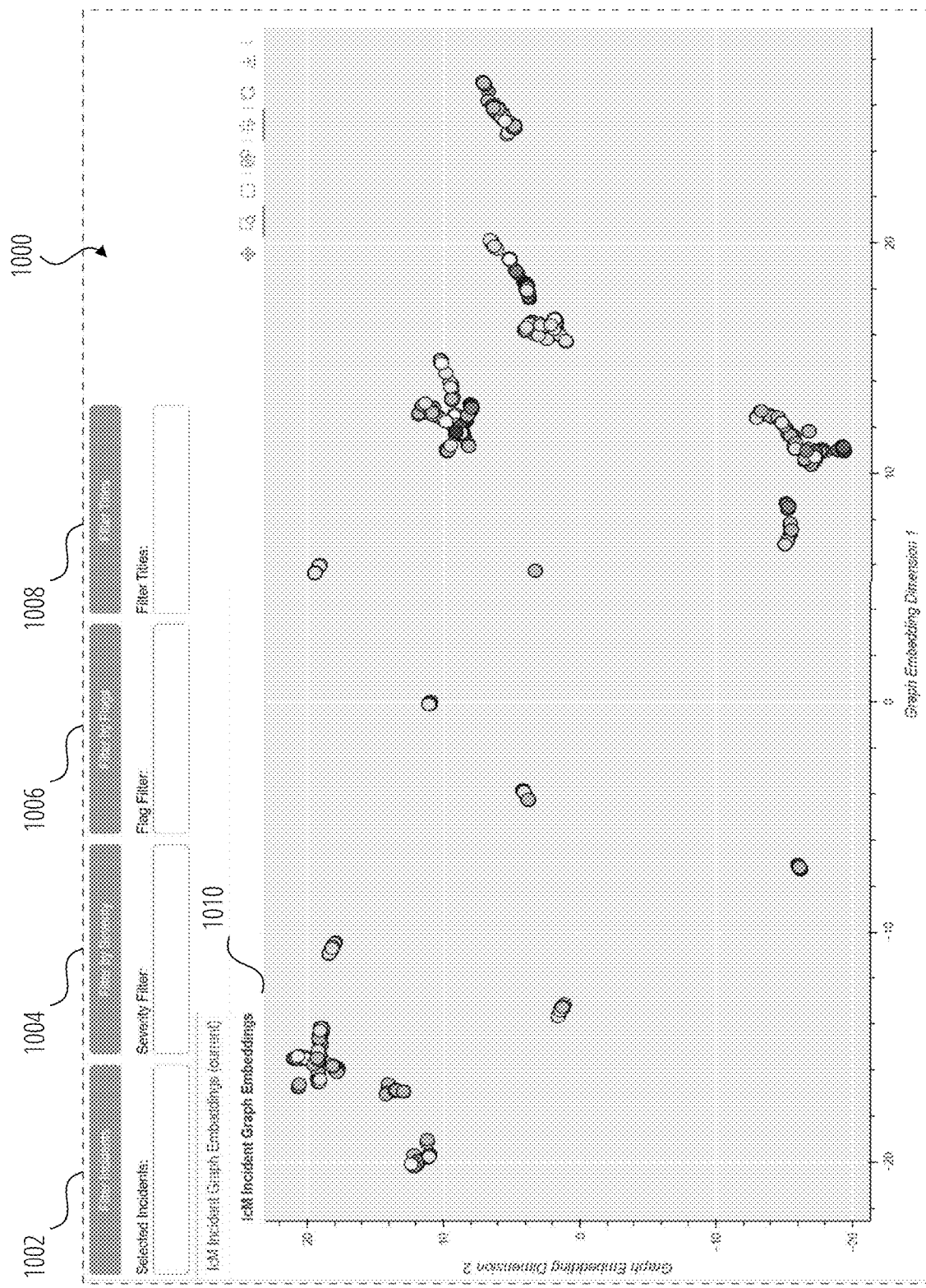
FIG. 10 illustrates an example of a graphical user interface in accordance with one example embodiment.

FIG. 10 illustrates an example of a graphical user interface in accordance with one example embodiment. In particular, FIG. 10 demonstrates an interactive graphical user interface 1000 that allows users to visually explore incidents and their reduced dimensionality embeddings. Example components include:

Incident filter 1002: a panel with various filter criteria to narrow down incidents based on attributes like severity, flags, and text search. This allows focusing just on subsets of interest. In one example, the incident graph embeddings 1010 shows the count of incidents selected by applying the configured filters.

Severity filter 1004: a dropdown menu to filter incidents by severity level. Severities like Critical, High, Medium, Low can be selected.

Flag filter 1006: a set of checkboxes to filter incidents marked with flags like Customer Impacting, Security Related, etc. Multiple flags can be selected to combine criteria.

Titles filter 1008: a text search box to filter incidents by matching their titles against search phrases or keywords.

The incident graph embeddings 1010 include an interactive 2D scatter plot that visually renders the reduced dimensionality embeddings for the currently filtered set of incidents. Related incidents cluster closer together based on vector similarity computed along multiple semantic dimensions. By applying filters and visually exploring the embedding space, users can discover groups of related incidents for further analysis. This helps identify broader trends and recurring problems.

Figure 11:
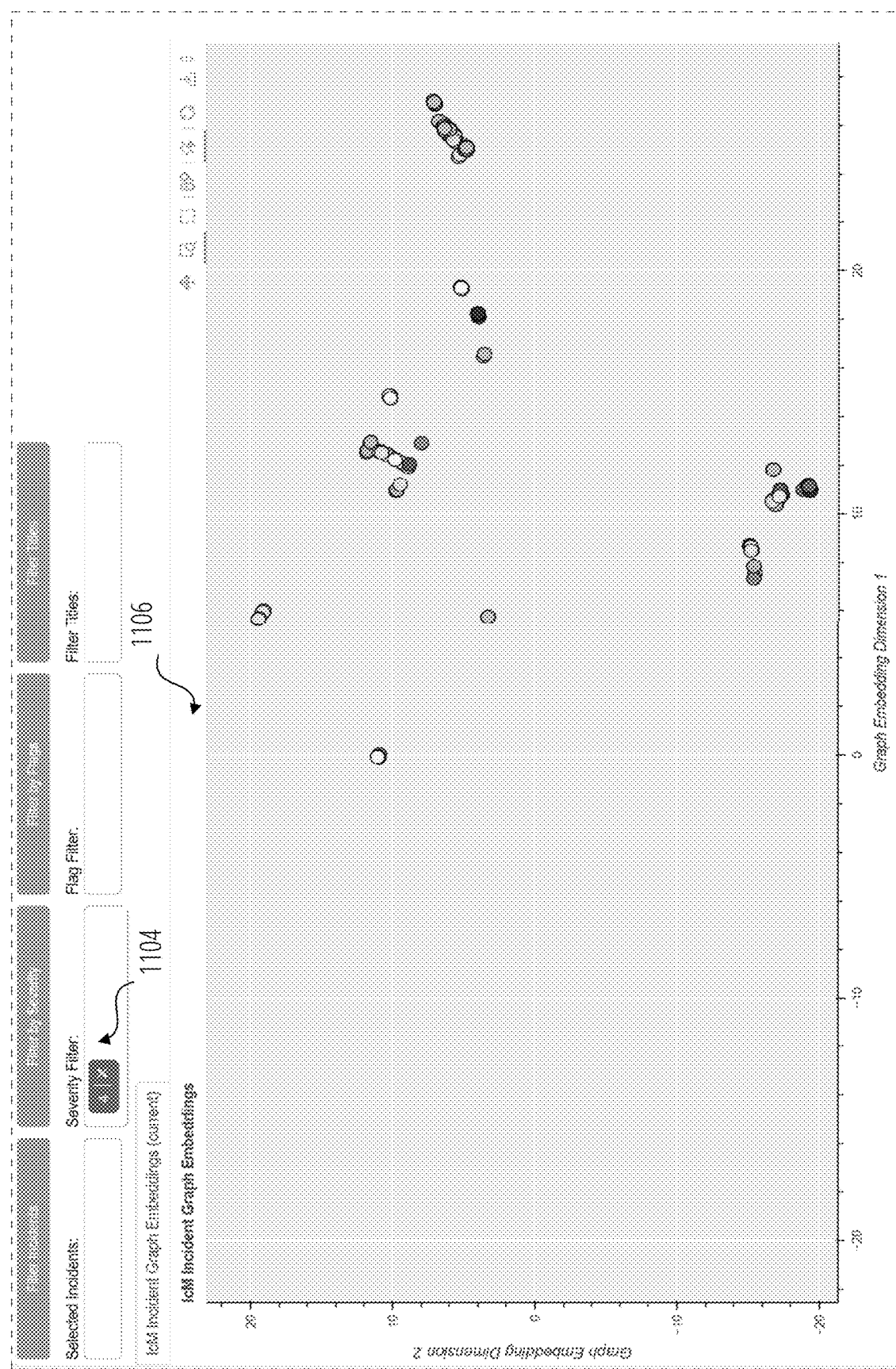
FIG. 11 illustrates an example of a graphical user interface with a filter value in accordance with one example embodiment.

FIG. 11 illustrates an example of a graphical user interface with a filter value in accordance with one example embodiment. A severity filter value 1104 is entered. The incident graph embeddings 1106 is updated based on the severity filter value 1104.

Figure 12:
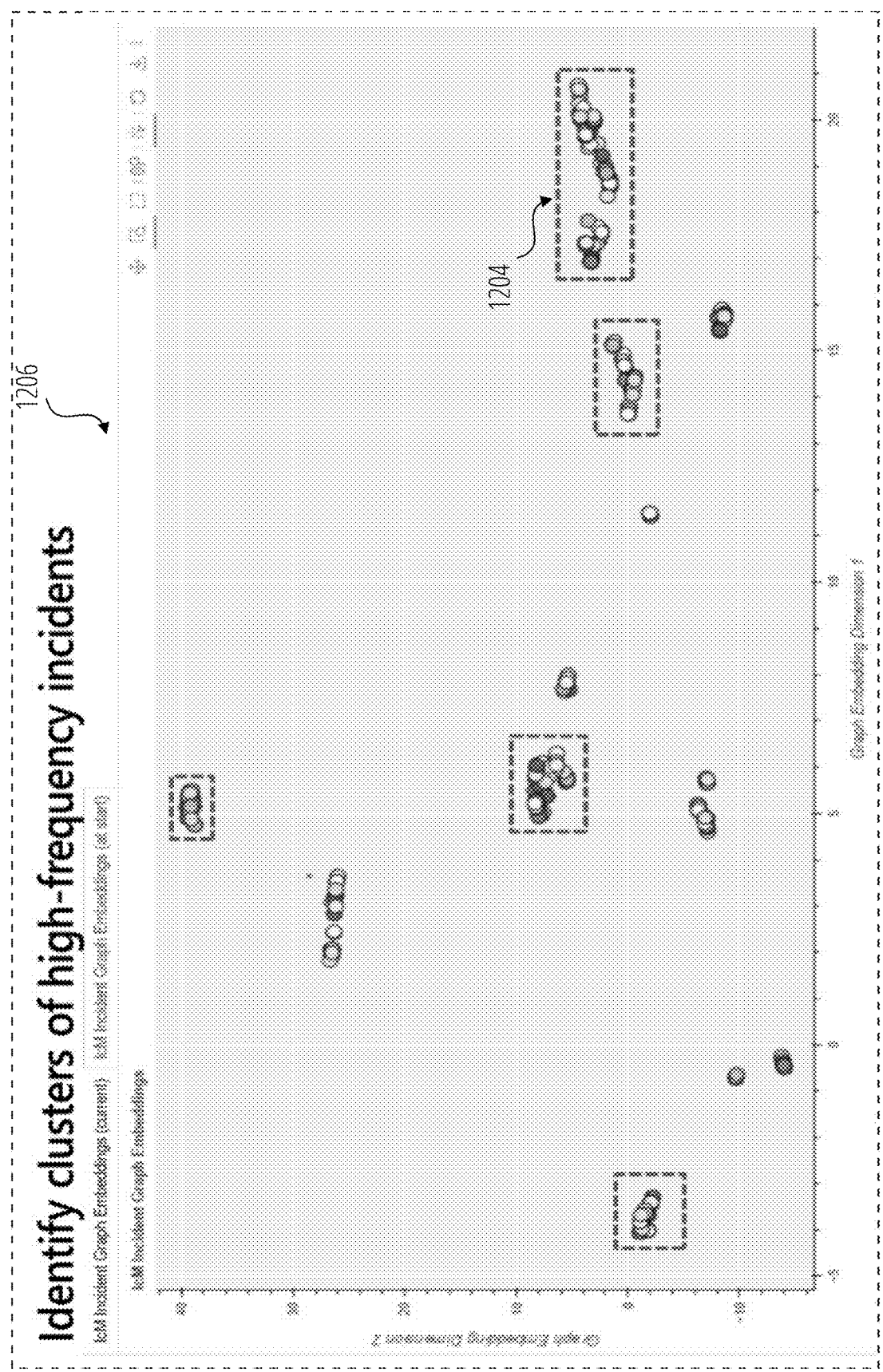
FIG. 12 illustrates an example of a graphical user interface that identifies clusters of incidents in accordance with one example embodiment.

FIG. 12 illustrates an example of an interactive graphical user interface 1206 that identifies clusters of incidents in accordance with one example embodiment. Cluster of closely related incidents reflecting semantic commonalities like symptoms, diagnoses, or remediations, are highlighted (e.g., cluster 1204).

Figure 13:
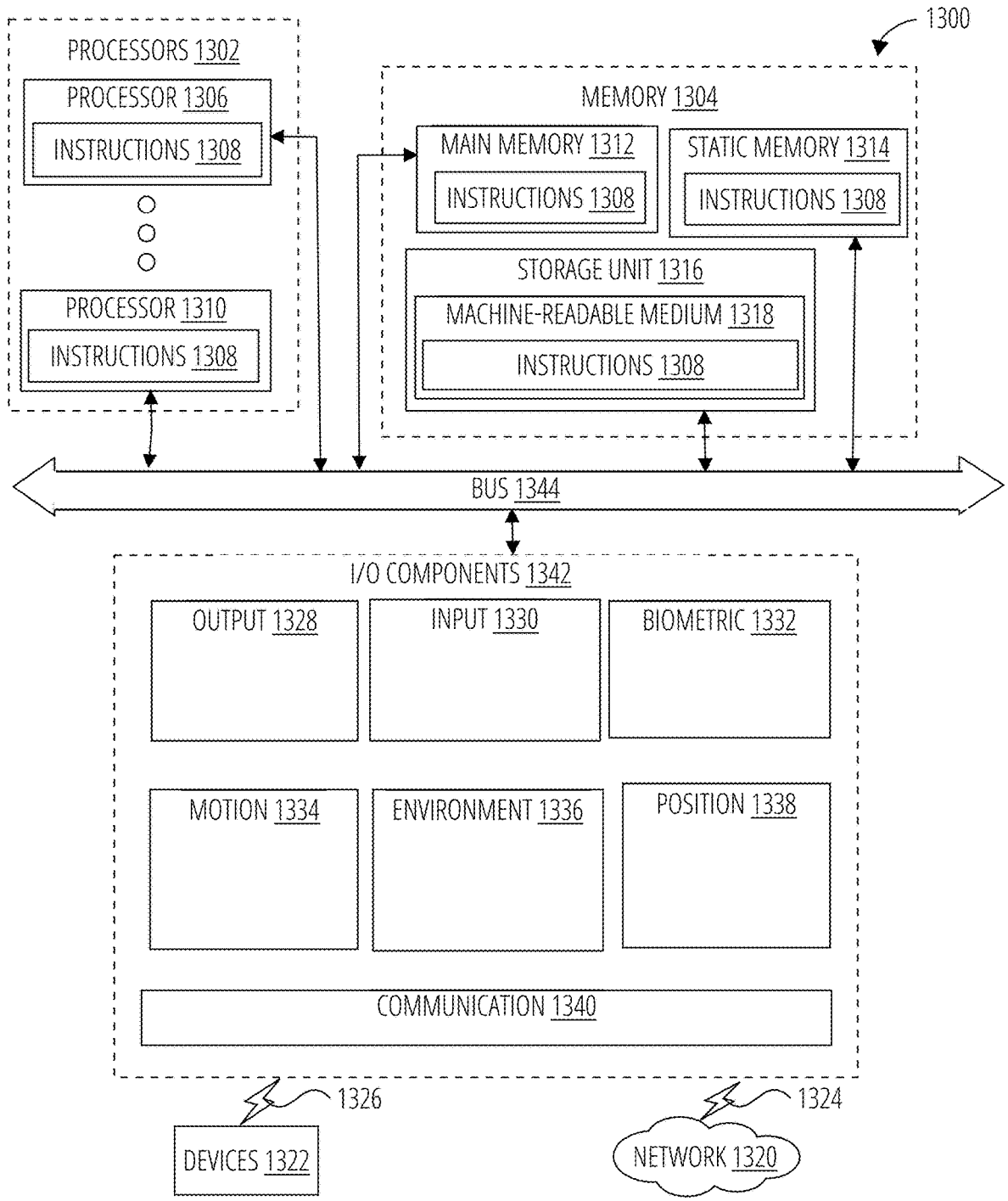
FIG. 13 is a diagrammatic representation of a machine in the form of a computer system within which a set of instructions may be executed for causing the machine to perform any one or more of the methodologies discussed herein, according to an example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: receiving, by one or more processors, service incident data comprising free-form text data, structured metadata, and human-generated comments; constructing, by the one or more processors, a graph representation of a service incident, the graph comprising nodes representing the free-form text data, structured metadata, and human-generated comments of the service incident, and edges connecting related nodes; generating, by the one or more processors, vector embeddings for the nodes and edges of the graph representation; applying, by the one or more processors, dimensionality reduction to the vector embeddings to generate reduced embeddings; and storing the reduced embeddings and the vector embeddings in a database.

In Example 2, the subject matter of Example 1 includes, receiving, by the one or more processors, a search query associated with a particular service incident; retrieving, by the one or more processors, one or more stored reduced embeddings or vector embeddings from the database based on similarity to embeddings of the particular service incident; and presenting, by the one or more processors, service incidents associated with the retrieved one or more stored embeddings to a user.

In Example 3, the subject matter of Examples 1-2 includes, wherein the free-form text data comprises at least one of: an incident title, an incident summary, mitigation steps, and resolution notes.

In Example 4, the subject matter of Examples 1-3 includes, wherein the structured metadata comprises at least one of: an incident team, an incident service, an incident severity, an associated monitor, and incident timestamps.

In Example 5, the subject matter of Examples 1-4 includes, wherein generating the vector embeddings comprises encoding features of the nodes and edges using at least one of: text embedding algorithms, time encoding, and categorical encoding.

In Example 6, the subject matter of Examples 1-5 includes, wherein applying dimensionality reduction comprises projecting the vector embeddings from hundreds of dimensions to two or three dimensions while preserving structural relationships between the nodes and edges.

In Example 7, the subject matter of Examples 1-6 includes, receiving an adjusted clustering threshold based on user interaction with a visual explorer interfacing with the reduced embeddings; and identifying one or more clusters of related service incidents based on locations of the incidents in the two or three dimensions of the reduced embeddings space.

In Example 8, the subject matter of Examples 1-7 includes, wherein retrieving the one or more stored, reduced embeddings comprises applying a similarity search based on an application of a metric to the reduced embedding space, and wherein presenting the service incidents comprises displaying graphical indicators of the service incidents overlaid on the reduced embeddings.

In Example 9, the subject matter of Examples 1-8 includes, determining an aggregate root cause or similarity in incident profile across the related service incidents in a cluster by automated analysis of the most common features and topologies in the service incident graphs associated with the cluster; assigning mitigation steps to the cluster based on the determined aggregate root cause; and programmatically appending the mitigation steps to any new service incidents associated with the cluster based on embedding similarities.

In Example 10, the subject matter of Examples 1-9 includes, determining frequencies, growth rates, or severity levels associated with the incident clusters; generating infrastructure or operational recommendations based on the incident cluster analytics to mitigate issues associated with the clusters; receiving the infrastructure or operational recommendations; and generating and routing alerts to corresponding teams based on which clusters are implicated by the recommendations.

Example 11 is a computing apparatus comprising: a processor; and a memory storing instructions that, when executed by the processor, configure the apparatus to perform operations comprising: receive, by one or more processors, service incident data comprising free-form text data, structured metadata, and human-generated comments; construct, by the one or more processors, a graph representation of a service incident, the graph comprising nodes representing the free-form text data, structured metadata, and human-generated comments of the service incident, and edges connecting related nodes; generate, by the one or more processors, vector embeddings for the nodes and edges of the graph representation; apply, by the one or more processors, dimensionality reduction to the vector embeddings to generate reduced embeddings; and store the reduced embeddings and the vector embeddings in a database.

In Example 12, the subject matter of Example 11 includes, wherein the instructions further configure the apparatus to: receive, by the one or more processors, a search query associated with a particular service incident; retrieve, by the one or more processors, one or more stored reduced embeddings or vector embeddings from the database based on similarity to embeddings of the particular service incident; and present, by the one or more processors, service incidents associated with the retrieved one or more stored embeddings to a user.

In Example 13, the subject matter of Examples 11-12 includes, wherein the free-form text data comprises at least one of: an incident title, an incident summary, mitigation steps, and resolution notes.

In Example 14, the subject matter of Examples 11-13 includes, wherein the structured metadata comprises at least one of: an incident team, an incident service, an incident severity, an associated monitor, and incident timestamps.

In Example 15, the subject matter of Examples 11-14 includes, wherein generating the vector embeddings comprises encode features of the nodes and edges using at least one of: text embedding algorithms, time encoding, and categorical encoding.

In Example 16, the subject matter of Examples 11-15 includes, wherein applying dimensionality reduction comprises project the vector embeddings from hundreds of dimensions to two or three dimensions while preserving structural relationships between the nodes and edges.

In Example 17, the subject matter of Examples 11-16 includes, wherein the instructions further configure the apparatus to: receive an adjusted clustering threshold based on user interaction with a visual explorer interfacing with the reduced embeddings; and identify one or more clusters of related service incidents based on locations of the incidents in the two or three dimensions of the reduced embeddings space.

In Example 18, the subject matter of Examples 11-17 includes, wherein retrieving the one or more stored, reduced embeddings comprises apply a similarity search based on an application of a metric to the reduced embedding space, and wherein presenting the service incidents comprises displaying graphical indicators of the service incidents overlaid on the reduced embeddings.

In Example 19, the subject matter of Examples 11-18 includes, wherein the instructions further configure the apparatus to: determine an aggregate root cause or similarity in incident profile across the related service incidents in a cluster by automated analysis of the most common features and topologies in the service incident graphs associated with the cluster; assign mitigation steps to the cluster based on the determined aggregate root cause; and programmatically append the mitigation steps to any new service incidents associated with the cluster based on embedding similarities.

Example 20 is a non-transitory computer-readable storage medium, the computer-readable storage medium including instructions that when executed by a computer, cause the computer to: receive, by one or more processors, service incident data comprising free-form text data, structured metadata, and human-generated comments; construct, by the one or more processors, a graph representation of a service incident, the graph comprising nodes representing the free-form text data, structured metadata, and human-generated comments of the service incident, and edges connecting related nodes; generate, by the one or more processors, vector embeddings for the nodes and edges of the graph representation; apply, by the one or more processors, dimensionality reduction to the vector embeddings to generate reduced embeddings; and store the reduced embeddings and the vector embeddings in a database.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:
1. A computer-implemented method comprising:
receiving, by one or more processors, service incident data comprising free-form text data, structured metadata, and human-generated comments;
constructing, by the one or more processors, a graph representation of a service incident, the graph comprising nodes representing the free-form text data, structured metadata, and human-generated comments of the service incident, and edges connecting related nodes;
generating, by the one or more processors, vector embeddings for the nodes and edges of the graph representation;
encoding signals in features attached to the nodes and edges with text embeddings, temporal weights, and categorical traits for edge-based weighting;
applying, by the one or more processors, dimensionality reduction to the vector embeddings to generate reduced embeddings while preserving adjacency constraints and the edge-based weighting that maintains structural and topological properties of the graph; and
storing the reduced embeddings and the vector embeddings in a database.
2. The computer-implemented method of claim 1, further comprising:
receiving, by the one or more processors, a search query associated with a particular service incident;

retrieving, by the one or more processors, one or more stored reduced embeddings or vector embeddings from the database based on similarity to embeddings of the particular service incident; and presenting, by the one or more processors, service incidents associated with the retrieved one or more stored embeddings to a user.

3. The computer-implemented method of claim 1, wherein the free-form text data comprises: an incident title, an incident summary, mitigation steps, and resolution notes,
wherein the structured metadata comprises: an incident team, an incident service, an incident severity, an associated monitor, and incident timestamps.

4. The computer-implemented method of claim 1, wherein the database employs an indexing method that links original vector embeddings and the reduced embeddings in real time, enabling retrieval and similarity searches based on both high-dimensional and reduced-dimensional spaces.

5. The computer-implemented method of claim 1, wherein generating the vector embeddings comprises encoding features of the nodes and edges using: text embedding algorithms, time encoding, and categorical encoding.

6. The computer-implemented method of claim 1, wherein applying dimensionality reduction comprises projecting the vector embeddings from hundreds of dimensions to two or three dimensions while preserving adjacency constraints and the edge-based weighting that maintains structural relationships between the nodes and edges.

7. The computer-implemented method of claim 6, further comprising:
receiving an adjusted clustering threshold based on user interaction with a visual explorer interfacing with the reduced embeddings; and
identifying one or more clusters of related service incidents based on locations of the incidents in the two or three dimensions of the reduced embeddings.

8. The computer-implemented method of claim 2, wherein retrieving the one or more stored, reduced embeddings comprises applying a similarity search based on an application of a metric to the reduced embedding, and wherein presenting the service incidents comprises displaying graphical indicators of the service incidents overlaid on the reduced embeddings.

9. The computer-implemented method of claim 1, further comprising:
determining an aggregate root cause or similarity in incident profile across the related service incidents in a cluster by automated analysis of the most common features and topologies in the service incident graphs associated with the cluster;
assigning mitigation steps to the cluster based on the determined aggregate root cause; and
programmatically appending the mitigation steps to any new service incidents associated with the cluster based on embedding similarities.

10. The computer-implemented method of claim 1, further comprising:
determining frequencies, growth rates, or severity levels associated with incident clusters;
generating infrastructure or operational recommendations based on incident cluster analytics to mitigate issues associated with the clusters;
receiving the infrastructure or operational recommendations; and
generating and routing alerts to corresponding teams based on which clusters are implicated by the recommendations.

11. A computing apparatus comprising:
a processor; and
a memory storing instructions that, when executed by the processor, configure the apparatus to perform operations comprising:
receive, by one or more processors, service incident data comprising free-form text data, structured metadata, and human-generated comments;
construct, by the one or more processors, a graph representation of a service incident, the graph comprising nodes representing the free-form text data, structured metadata, and human-generated comments of the service incident, and edges connecting related nodes;
generate, by the one or more processors, vector embeddings for the nodes and edges of the graph representation;
encode signals in features attached to the nodes and edges with text embeddings, temporal weights, and categorical traits for edge-based weighting;
apply, by the one or more processors, dimensionality reduction to the vector embeddings to generate reduced embeddings while preserving adjacency constraints and the edge-based weighting that maintains structural and topological properties of the graph; and
store the reduced embeddings and the vector embeddings in a database.

12. The computing apparatus of claim 11, wherein the instructions further configure the apparatus to:
receive, by the one or more processors, a search query associated with a particular service incident;
retrieve, by the one or more processors, one or more stored reduced embeddings or vector embeddings from the database based on similarity to embeddings of the particular service incident; and
present, by the one or more processors, service incidents associated with the retrieved one or more stored embeddings to a user.

13. The computing apparatus of claim 11, wherein the free-form text data comprises: an incident title, an incident summary, mitigation steps, and resolution notes,
wherein the structured metadata comprises: an incident team, an incident service, an incident severity, an associated monitor, and incident timestamps.

14. The computing apparatus of claim 11, wherein the database employs an indexing method that links original vector embeddings and the reduced embeddings in real time, enabling retrieval and similarity searches based on both high-dimensional and reduced-dimensional spaces.

15. The computing apparatus of claim 11, wherein generating the vector embeddings comprises encode features of the nodes and edges using: text embedding algorithms, time encoding, and categorical encoding.

16. The computing apparatus of claim 11, wherein applying dimensionality reduction comprises project the vector embeddings from hundreds of dimensions to two or three dimensions while preserving adjacency constraints and the edge-based weighting that maintains structural relationships between the nodes and edges.

17. The computing apparatus of claim 16, wherein the instructions further configure the apparatus to:
receive an adjusted clustering threshold based on user interaction with a visual explorer interfacing with the reduced embeddings; and
identify one or more clusters of related service incidents based on locations of the incidents in the two or three dimensions of the reduced embeddings.

18. The computing apparatus of claim 12, wherein retrieving the one or more stored, reduced embeddings comprises apply a similarity search based on an application of a metric to the reduced embedding, and wherein presenting the service incidents comprises displaying graphical indicators of the service incidents overlaid on the reduced embeddings.

19. The computing apparatus of claim 11, wherein the instructions further configure the apparatus to:

determine an aggregate root cause or similarity in incident profile across the related service incidents in a cluster by automated analysis of the most common features and topologies in the service incident graphs associated with the cluster;

assign mitigation steps to the cluster based on the determined aggregate root cause; and programmatically append the mitigation steps to any new service incidents associated with the cluster based on embedding similarities.

20. A non-transitory computer-readable storage medium, the computer-readable storage medium including instructions that when executed by a computer, cause the computer to:

receive, by one or more processors, service incident data comprising free-form text data, structured metadata, and human-generated comments;

construct, by the one or more processors, a graph representation of a service incident, the graph comprising nodes representing the free-form text data, structured metadata, and human-generated comments of the service incident, and edges connecting related nodes;

generate, by the one or more processors, vector embeddings for the nodes and edges of the graph representation;

encode signals in features attached to the nodes and edges with text embeddings, temporal weights, and categorical traits for edge-based weighting;

apply, by the one or more processors, dimensionality reduction to the vector embeddings to generate reduced embeddings while preserving adjacency constraints and the edge-based weighting that maintains structural and topological properties of the graph; and store the reduced embeddings and the vector embeddings in a database.

* * * * *